United States Patent
Suldhal (10) Patent No.: US 10,496,491 B1
(45) Date of Patent: Dec. 3, 2019

(54) CLONING A VOLUME DRAWN FROM DIFFERENT STORAGE TIERS WITH CONSISTENT PERFORMANCE

(71) Applicant: EMC Corporation, Hopkinton, MA (US)

(72) Inventor: Dayanand Suldhal, New Canaan, CT (US)

(73) Assignee: EMC IP Holding Company LLC, Hopkinton, MA (US)

( * ) Notice: Subject to any disclaimer, the term of this patent is extended or adjusted under 35 U.S.C. 154(b) by 246 days.

(21) Appl. No.: 14/871,242

(22) Filed: Sep. 30, 2015

(51) Int. Cl.
| *G06F 12/00* | (2006.01) |
| *G06F 11/14* | (2006.01) |
| *G06F 3/06* | (2006.01) |
| *G06F 12/0802* | (2016.01) |
| *G06F 16/172* | (2019.01) |
| *G06F 16/178* | (2019.01) |
| *G06F 16/182* | (2019.01) |

(52) U.S. Cl.
CPC .......... *G06F 11/1456* (2013.01); *G06F 3/065* (2013.01); *G06F 3/067* (2013.01); *G06F 3/0619* (2013.01); *G06F 3/0689* (2013.01); *G06F 11/1464* (2013.01); *G06F 12/0802* (2013.01); *G06F 16/172* (2019.01); *G06F 16/178* (2019.01); *G06F 16/182* (2019.01); *G06F 2201/84* (2013.01); *G06F 2212/1032* (2013.01); *G06F 2212/154* (2013.01); *G06F 2212/463* (2013.01)

(58) Field of Classification Search
CPC .. G06F 11/1456; G06F 12/0802; G06F 3/065; G06F 3/0689; G06F 17/30174; G06F 17/30132; G06F 3/067; G06F 17/30194; G06F 11/1464; G06F 3/0619; G06F 2212/1032; G06F 2212/463; G06F 2212/154; G06F 2201/84

See application file for complete search history.

(56) References Cited

U.S. PATENT DOCUMENTS

| 9,400,792 B1 | 7/2016 | Bono et al. | |
| 2006/0069862 A1* | 3/2006 | Kano | G06F 3/0605 |
| | | | 711/114 |
| 2007/0185934 A1* | 8/2007 | Cannon | G06F 11/1469 |
| 2007/0239803 A1* | 10/2007 | Mimatsu | G06F 3/0605 |

(Continued)

OTHER PUBLICATIONS

Jean-Pierre Bono, et al.; "Preserving Quality of Service When Replicating Data Objects"; U.S. Appl. No. 14/576,939, filed Dec. 19, 2014.

(Continued)

*Primary Examiner* — Shawn X Gu
(74) *Attorney, Agent, or Firm* — BainwoodHuang (57) ABSTRACT

Embodiments are directed to techniques for matching the storage tiers used to back a cloned storage object with the storage tiers used to back the source storage object from which the cloned storage object is to be created. This may be done by determining the storage tier for each source storage extent that backs the source storage object and allocating, for each source storage extent, a corresponding cloned storage extent that matches that source storage extent. Data may then be copied from each storage extent on the source to the corresponding storage extent on the clone.

14 Claims, 5 Drawing Sheets

(56) References Cited

U.S. PATENT DOCUMENTS

| | | | | |
|---|---|---|---|---|
| 2008/0071983 A1* | 3/2008 | Kamei | ................ | G06F 12/0871 |
| | | | | 711/113 |
| 2011/0197027 A1* | 8/2011 | Balasubramanian | ... | G06F 3/061 |
| | | | | 711/117 |
| 2012/0124309 A1* | 5/2012 | Watanabe | ............. | G06F 3/0607 |
| | | | | 711/162 |
| 2012/0159097 A1* | 6/2012 | Jennas, II | ............. | G06F 3/0611 |
| | | | | 711/162 |
| 2014/0215458 A1* | 7/2014 | Devarapalli | ............ | G06F 9/455 |
| | | | | 718/1 |

OTHER PUBLICATIONS

Jean-Pierre Bono, et al.; "Managing Host Data Placed in a Container File System on a Data Storage Array Having Multiple Storage Tiers"; U.S. Appl. No. 13/929,019, fied Jun. 27, 2013.

* cited by examiner

CLONING A VOLUME DRAWN FROM DIFFERENT STORAGE TIERS WITH CONSISTENT PERFORMANCE

BACKGROUND

Data storage systems are arrangements of hardware and software that include one or more storage processors coupled to arrays of non-volatile storage devices. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

In order to satisfy different performance needs, a data storage system may include several storage tiers, each storage tier having respective performance characteristics. For example, the data storage system may provide a "Gold" storage tier for applications having very high performance needs, a "Silver" tier for applications having somewhat high performance needs, and a "Bronze" tier for applications having normal performance needs. The "Gold" storage tier may be made up of high speed solid state storage devices, the "Silver" tier may be made up of high speed magnetic drives, and the "Bronze" tier may be made up of standard magnetic drives. Some host-accessible data objects, such as LUNs, file systems, per-VM virtual volumes (VVols), etc. may be drawn from a particular storage tier in the case of use for a particular application having special performance needs. Other storage objects may not have specified storage tiers, being drawn from a variety of available storage tiers.

SUMMARY

Unfortunately, performance inconsistencies may arise when a storage object is cloned. For example, when a source storage object is cloned, storage extents are allocated to back the cloned object. The storage extents allocated for the cloned object may be drawn from a variety of storage tiers, typically based on availability. Thus, the storage tiers that compose the cloned object will typically differ from those that compose the source object. The resulting mismatch in storage tiering may cause performance differences between source and clone, as some storage extents may be accessed faster and with lower latencies on the source storage object than on the cloned storage object, and vice-versa.

Thus, it would be desirable to implement a data storage system capable of matching the storage tiers used to back a cloned storage object with the storage tiers used to back the source storage object from which the cloned storage object is to be created. This may be done by determining the storage tier for each source storage extent that backs the source storage object and allocating, for each source storage extent, a corresponding cloned storage extent that matches that source storage extent. Data may then be copied from each storage extent on the source to the corresponding storage extent on the clone.

One embodiment of the improved techniques is directed to a method, performed by a data storage system, of cloning a source logical disk backed by a plurality of source storage extents. The method includes (a) accessing metadata of the source logical disk to ascertain, for each of the plurality of source storage extents, a respective storage tier from which that source storage extent is composed, the respective storage tier having a performance level different from that of other storage tiers in the data storage system, (b) for each of the plurality of source storage extents, allocating a respective cloned storage extent to back a cloned logical disk, each of the cloned storage extents allocated from a storage tier having a performance level that matches the performance level of the storage tier from which the respective source storage extent is composed, and (c) copying data from the plurality of source storage extents to the respective cloned storage extents, thus providing storage tiering for the cloned logical disk that matches storage tiering for the source logical disk. Embodiments are also directed to a corresponding apparatus, computer program product, and system for performing similar methods.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views. In the accompanying drawings.

DETAILED DESCRIPTION

Embodiments of the invention will now be described. It is understood that such embodiments are provided by way of example to illustrate various features and principles of the invention, and that the invention hereof is broader than the specific example embodiments disclosed.

Embodiments are directed to techniques for matching the storage tiers used to back a cloned storage object with the storage tiers used to back the source storage object from which the cloned storage object is to be created. This may be done by determining the storage tier for each source storage extent that backs the source storage object and allocating, for each source storage extent, a corresponding cloned storage extent that matches that source storage extent. Data may then be copied from each storage extent on the source to the corresponding storage extent on the clone.

Figure 1:
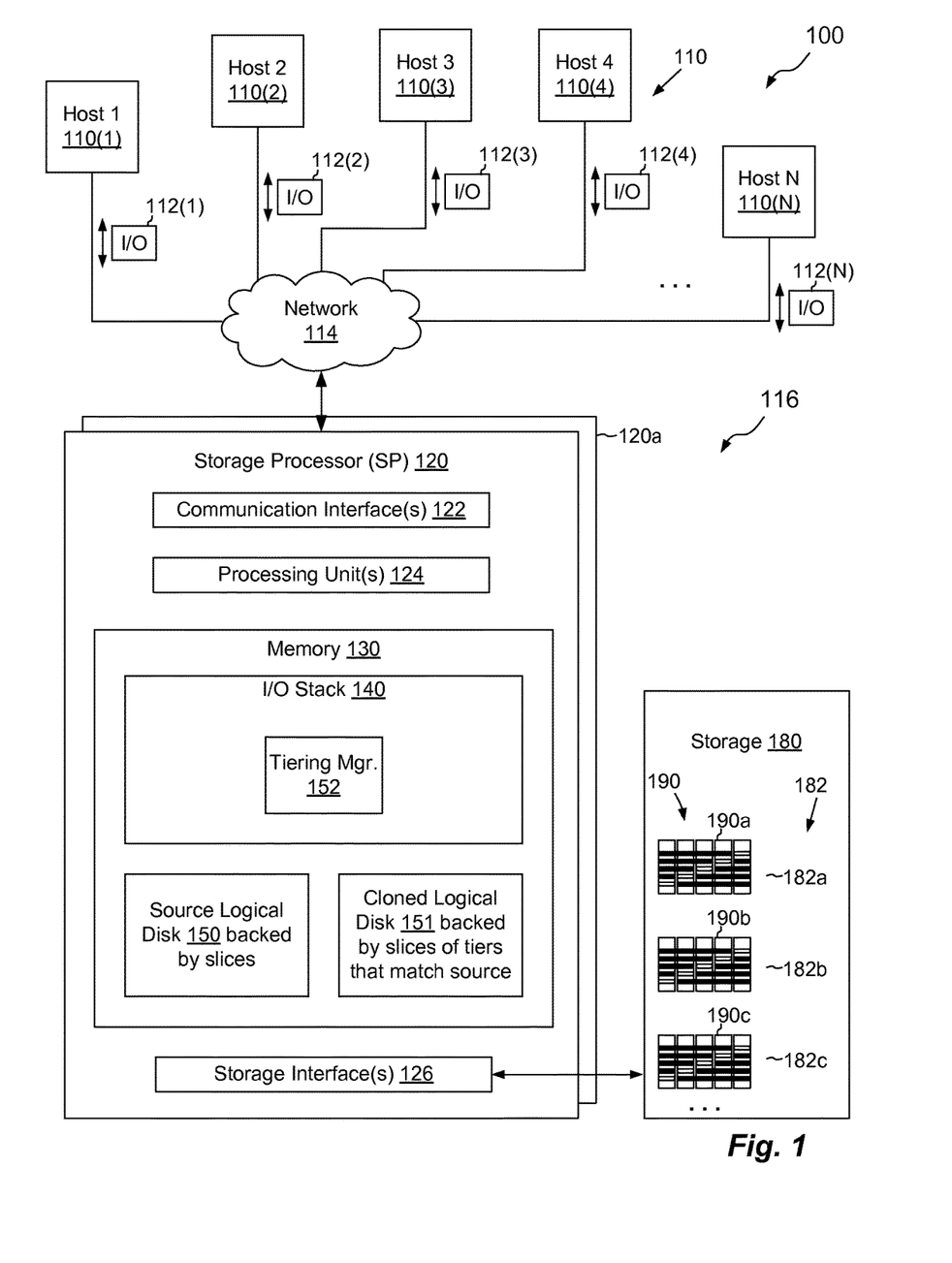
FIG. 1 is a block diagram depicting a logical view of an example system according to various embodiments.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor (SP) 120 and data storage 180.

In an example, the storage 180 includes RAID groups 190a, 190b, and 190c (collectively, 190), where each RAID group 190 is composed of multiple disk drives. The disk drives may include magnetic disk drives, electronic flash drives, optical drives, and/or other types of drives. In a typical example, each of the RAID groups 190 includes disk drives of a common type that provide similar performance. For example, RAID group 190a may include a first tier 182a drawn from high-speed flash or solid-state storage drives, RAID group 190*b* may make up a second tier 182*b* drawn from high speed (e.g., 15,000 RPM) magnetic disk drives having large (e.g., 1 GB) caches, and RAID group 190*c* may make up a third storage tier 182*c* drawn from slower (e.g., 7,200 RPM) magnetic disk drives without large caches. Any number of RAID groups 190 and any number of storage tiers 182 may be provided. In addition, each type of storage (e.g., magnetic, flash, optical) may itself provide multiple storage tiers 182, based on differing performance levels within the respective type. Any number of tiers 182 of storage may be provided.

The data storage system 116 may include multiple SPs like the SP 120 (e.g., a second SP, 120*a*). For example, multiple SPs 120 may be provided as circuit board assemblies, or "blades," which plug into a chassis, which encloses and cools the SPs 120. The chassis has a backplane for interconnecting the SPs 120, and additional connections may be made among SPs 120 using cables. It is understood, however, that no particular hardware configuration is required, as any number of SPs 120, including a single SP 120, may be provided and the SP 120 can be any type of computing device capable of processing host I/Os.

Although FIG. 1 shows only a single data storage system 116, it is understood that many operations described herein involve activities that take place between two data storage systems, i.e., between a source data storage system (source) and a destination data storage system (destination). The source and destination may be connected via the network 114 or via any suitable means. The particular construction shown for the data storage system 116 is intended to be representative of both the source and the destination, although it should be understood that the source and the destination may vary in their particular details.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive I/O requests 112(1-N) according to both block-based and file-based protocols and to respond to such I/O requests 112(1-N) by reading or writing the storage 180.

The SP 120 is seen to include one or more communication interfaces 122, a set of processing units 124, one or more storage interfaces 126, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 may include numerous multi-core CPUs. The storage interfaces 126 include, for example, SCSI adapters and other disk interface adapters for converting between the software of the back end 144 and the hardware of storage 180.

The memory 130 may include both volatile memory (e.g., random access memory, RAM), and non-volatile memory, such as one or more read-only memories (ROMs), disk drives, solid-state drives, and the like. At a minimum, memory 130 includes system memory, typically RAM. The set of processing units 124 and the memory 130 together form control circuitry, which is constructed and arranged to carry out various methods and functions as described herein, e.g., alone or in coordination with similar control circuitry on another data storage system. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons. Applications configured to run on processing units 124 when stored in non-transient form, either in the volatile portion or the non-volatile portion of memory 130 or both, form a computer program product. The processing circuitry 124 running one or more of these applications thus forms a specialized circuit constructed and arranged to carry out the various processes described herein.

As shown in FIG. 1, the memory 130 includes an I/O stack 140 and one or more logical disks 150, 151 that are exposed to hosts 110. The I/O stack 140 provides an execution path for host I/Os (e.g., I/O requests 112(1-N)).

The logical disks 150, 151 are storage structures that either directly provide or that form a basis for providing a host-accessible data object, such as LUNs, volumes, file-systems, and/or vVols (virtual volumes, e.g., as available for VMware, Inc. of Palo Alto, Calif.). For example, a host-accessible LUN or vVol may be a direct expression of a logical disk 150, while a host-accessible file system may be constructed on the logical disk 150, e.g., the logical disk 150 may serve as a volume upon which the file system is built.

The I/O stack 140 is seen to include a tiering manager 152. The tiering manager 152 directs the I/O stack 140 to store data in the storage tiers 182*a* through 182*c* as appropriate.

In example operation, the hosts 110(1-N) issue I/O requests 112(1-N) to the data storage system 116. The SP 120 receives the I/O requests 112(1-N) at the communication interfaces 122 and passes the I/O requests 112 to the I/O stack 140 for further processing. Such processing includes mapping I/O requests 112, which are directed to LUNs, volumes, host file systems, and/or VVols, for example, to internal block-based requests directed to logical disks 150, 151. The processing on the I/O stack 140 further includes mapping the logical disks 150, 151 to respective internal files stored in container file systems of the data storage system 116. The I/O stack 140 thus converts incoming host I/O requests 112 into requests to logical disks 150, 151, which are, in turn, mapped to an internal file. The container file system is built upon a volume, which is composed from logical extents. Each logical extent is in turn composed from storage from a single storage tier 182.

For I/O requests 112(1-N) that specify allocating writes of particular logical disks 150, 151, the tiering manager 152 identifies storage tiers 182 on which to place the newly arriving data. The I/O requests continue to propagate through the I/O stack 140, which executes commands for reading and/or writing the physical storage 180, in accordance with the storage tiering specified by the tiering manager 152.

Additional information about storage tiering and I/O stack mapping may be found in copending U.S. patent application Ser. No. 13/928,591, filed Jun. 27, 2013, copending U.S. patent application Ser. No. 13/828,294, filed Mar. 14, 2013, and copending U.S. patent application Ser. No. 14/576,939, filed Dec. 19, 2014. The contents and teachings of these prior applications are incorporated by reference herein in their entirety.

In example operation, a host 110 requests that a source logical disk 150 be cloned to create a cloned logical disk 151. The source logical disk 150 is backed by storage extents (e.g., slices of size 256 MB or 1 GB, for example) from one or more storage tiers 182. In some examples, source logical disk 150 is not pre-assigned to a particular storage tier 182, but rather source logical disk 150 may be assigned slices of backing from storage 180 as needed, e.g., based on slice availability, such that the source logical disk 150 includes slices of different storage tiers 182. In other examples, source logical disk 150 is deliberately placed on a particular storage tier 182 or includes different portions deliberately placed on different storage tiers 182. As source logical disk 150 is backed with storage 180, slices may be assigned from various storage tiers 182 as available. This assignment may, for example, be based on which storage tier 182 currently has a lowest percent utilization.

In accordance with improvements hereof, a process of cloning the source logical disk 150 is provided with tiering information about the source logical disk 150 on a per-slice basis, such that the cloning process may match the storage tiering of the cloned logical disk 151 to be created with that of the source logical disk 150. Thus, instead of assigning slices to back the cloned logical disk 151 in based on availability, the tiering manager 152 assigns slices to the cloned logical disk 151 based on which storage tier 182 is used for the corresponding slice of the source logical disk 150.

Figure 2:
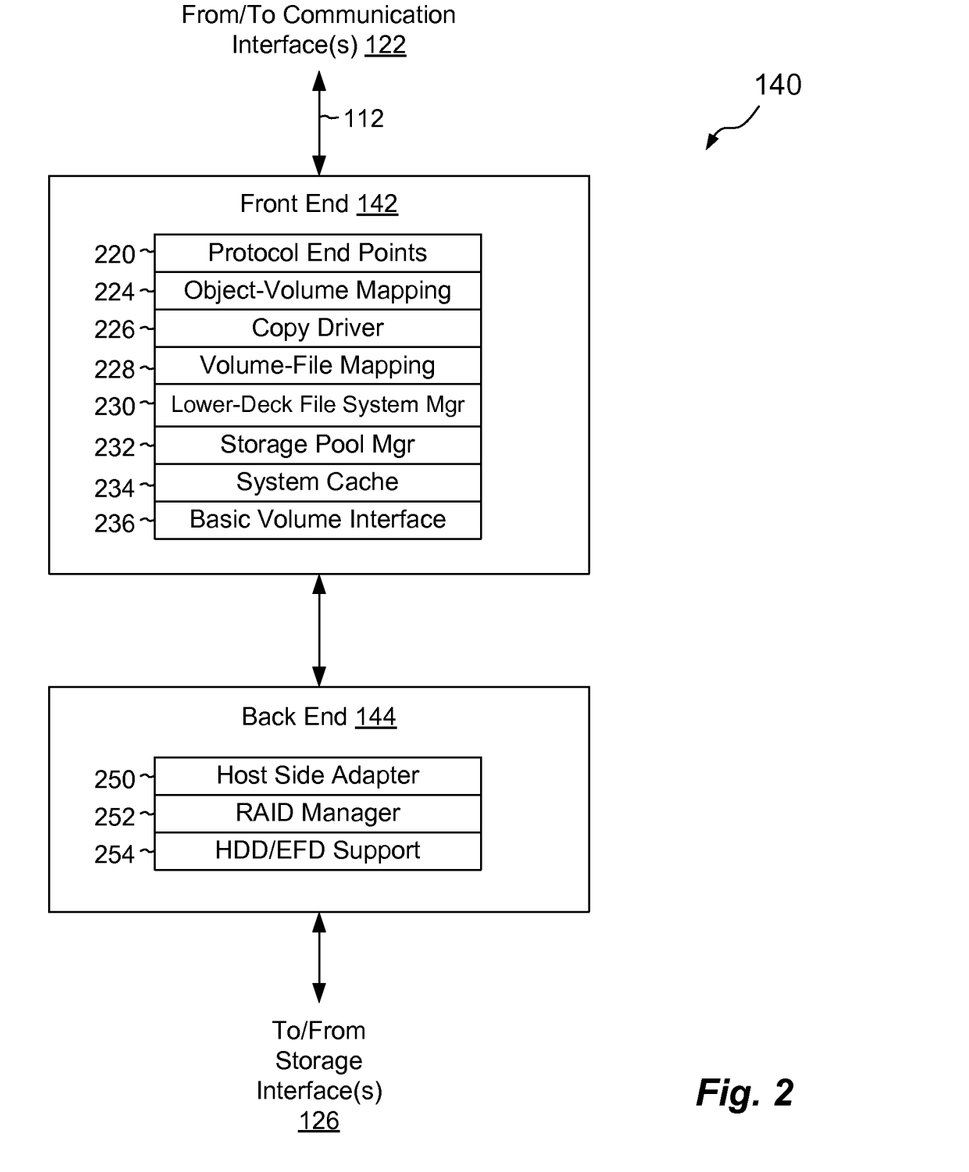
FIG. 2 is a block diagram depicting an example I/O stack for use in conjunction with various embodiments.

FIG. 2 shows features of the example I/O stack 140 of FIG. 1 in additional detail. The inclusion of FIG. 2 herein is intended to provide example context for the disclosed embodiments.

As shown in FIG. 2, the I/O stack 140 includes a front end 142 and a back end 144. The front end 142 and back end 144 may be operated together on the same SP 120, or may be operated on different SPs 120, e.g., in a modular arrangement. Further, the front end 142 may be connected directly to a separate block-based array, e.g., in a gateway arrangement, with back-end functionality provided by the block-based array.

The front end 142 is seen to include, from top to bottom, protocol end points 220, an object-volume mapping layer 224, a copy driver 226, a volume-file mapping 228, a lower-deck (internal) file system manager 230, a storage pool manager 232, a system cache 234, and a basic volume interface 236. There may be multiple instances of one or more of these layers 220-236 running within the front end 142 as needed. For example, if there are multiple storage pools, there may be a separate instance of the storage pool manager 232 running for each storage pool.

The back end 144 is seen to include a host side adapter 250, a RAID manager 252, and hard disk drive/electronic flash drive support 254. Although I/O requests 112 enter the I/O stack 140 from the top and propagate down (from the perspective of FIG. 2), the components of the I/O stack 140 are described herein from the bottom to the top to promote ease of understanding.

At the back end 144, the hard disk drive/electronic flash drive support 254 includes drivers that perform the actual reading from and writing to the magnetic disk drives, electronic flash drives, etc., in the storage 180 via storage interface circuitry 126. The RAID manager 252 arranges the storage media into RAID groups 190 and provides access to the RAID groups 190 using RAID protocols. The RAID manager 252 also expresses RAID groups 190 in the form of internal LUNs (not shown). The host side adapter 250 provides an interface to the front end 142, for implementations in which the front end 142 and back end 144 are run on different machines or SPs. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different machines or SPs. The basic volume interface 236 may also be disabled in the arrangement shown in FIG. 1.

The system cache 234 provides data caching services. For example, the system cache 234 caches data written from I/O requests 112 to storage volumes 150, 151. During cloning, the system cache 234 may participate in moving data from the source volume 150 to the cloned volume 151. In an example, the system cache 134 is implemented in DRAM (Dynamic Read-Only Memory) and is mirrored across SPs, e.g., between SP 120 and SP 120a. In some examples, the system cache 234 is battery-backed to provide persistence in the event of a power loss.

The storage pool manager 232 organizes elements of the storage 180 in the form of storage extents. In an example, the storage extents are provided in the form of slices. A slice is an increment of storage space, such as 256 MB or 1 GB in size, which is composed from a portion of an internal LUN, which may be made up of, for example, one or more RAID stripes across a RAID group 190. The storage pool manager 232 may allocate slices to lower-deck file systems (e.g., container filesystems) from storage pools to back the storage of logical disks 150, 151. The storage pool manager 232 may also deallocate slices from lower-deck file systems if storage provided by those slices is no longer required.

The lower-deck file system manager 230 builds and manages internal, lower-deck file systems upon slices served by the storage pool manager 232. In some examples, lower-deck file systems can realize both block-based objects and file-based objects in the form of files. The data storage system 116 may include any number of lower-deck file systems, and each lower-deck file system may include any number of files. In a typical arrangement, a different lower-deck file system is provided for realizing each of logical disks 150, 151. Each lower-deck file system includes one file that realizes the logical disk 150, 151 and, in some instances, includes other files that realize snapshots of the file that stores that logical disk 150, 151 at previous points in time. Some implementations allow for storing additional files. Each lower-deck file system may have an inode table (not depicted). The inode table provides a different inode for each file stored in the respective lower-deck file system. Each inode stores properties of a respective file, such as its ownership and size, and includes information for accessing the file's data.

The volume-file mapping 228 maps each file realizing a logical disk 150, 151 to the logical disk itself. Higher levels of the I/O stack 140 can then access the logical disk 150, 151 using block-based semantics. The volume-file mapping can be achieved in a variety of ways. According to one example, a file realizing a logical disk 150, 151 is regarded as a range of blocks, and the range of blocks is expressed as a corresponding range of logical offsets into the file. Because logical disks 150, 151 may be accessed based on identifier (logical unit number) and offset, the volume-file mapping 228 can establish a one-to-one correspondence between logical offsets into a file and physical offsets into the corresponding logical disk 150, 151, thus providing the requisite translation needed to express the file in the form of a logical disk.

The copy driver 226 provides fast copy services between lower-deck file systems. In an example, the copy driver 226 works in coordination with system cache 234 to perform efficient copying without the aid of additional buffers. Such copies may be made between lower-deck file systems, between storage pools, and between SPs 120. In an example, the copy driver 226 includes different driver components, one component per logical disk 150, 151, and each component may be created and/or destroyed based on whether access to the respective logical disk 150, 151 is required.

The object-volume mapping layer 224 maps logical disks 150, 151 to respective host-accessible data objects, such as host LUNs, host volumes, host file systems, and vVols, for example.

The protocol end points 220 expose the host-accessible data objects to hosts 110 in accordance with respective protocols for accessing those data objects. Thus, the protocol end points 220 may expose block-based objects (e.g., LUNs and block-based VVols) using Fibre Channel or iSCSI and may expose file-based objects (e.g., host file systems and file-based VMDs, e.g., file-based VVols) using NFS, CIFS, or SMB 3.0, for example.

Figure 3:
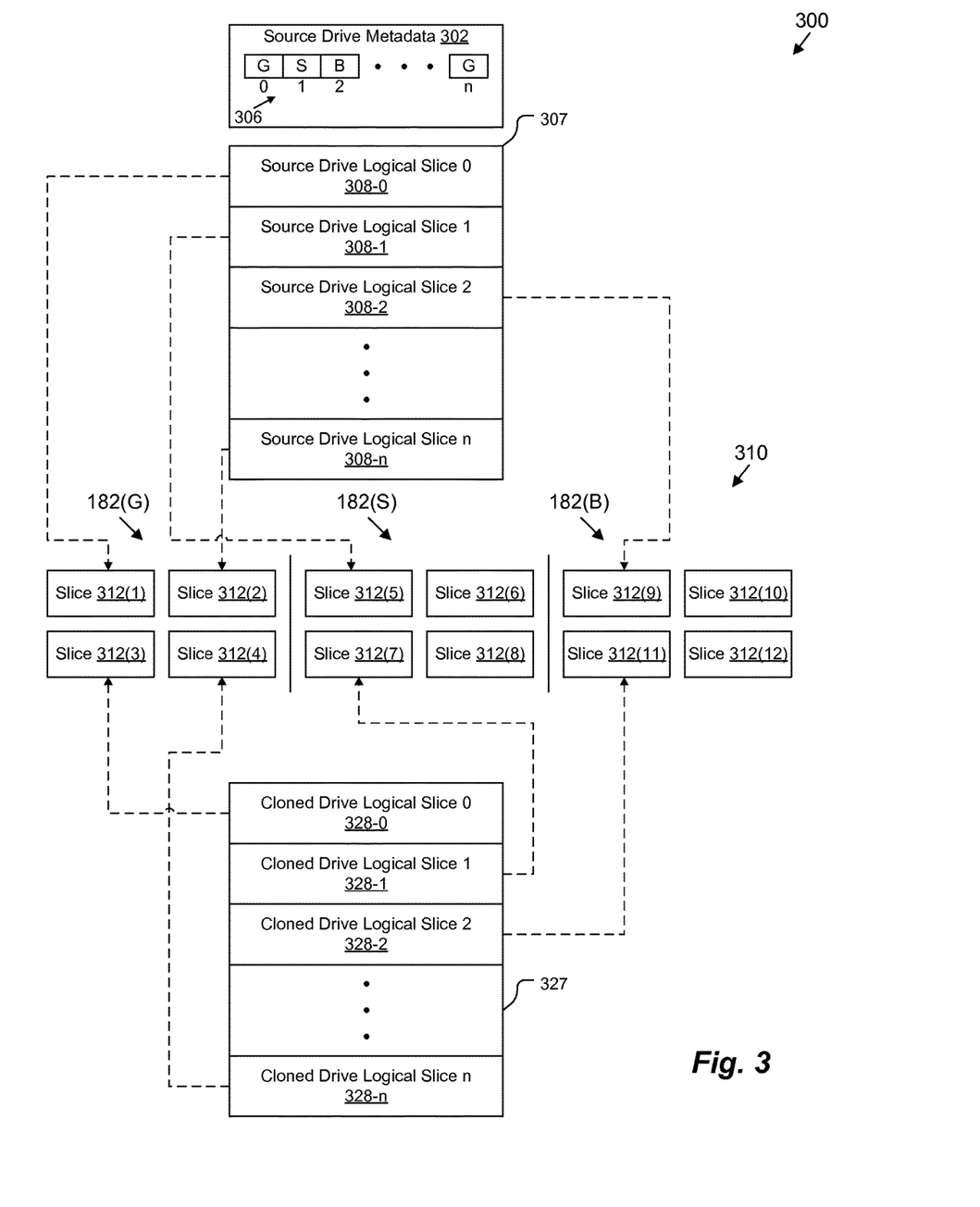
FIG. 3 is a block diagram depicting an example layout of slices in an example cloning operation according to various embodiments.

FIG. 3 depicts an example arrangement 300 of a particular example source logical disk 150 (depicted as source drive 307) being cloned onto a particular example cloned logical disk 151 (depicted as cloned drive 327).

Source drive 307 has associated source drive metadata 302 (which may be stored, for example, within metadata of either a storage pool or a lower-deck container filesystem) that includes information about source drive 307. In particular, source drive metadata 302 may include a tiering table 306 that stores a mapping of individual slices, numbered 0 to n, to particular storage tiers 182 (depicted as gold tier 182(G), silver tier 182(S), and bronze tier 182(B) within a storage pool 310). Thus, as depicted, tiering table 306 indicates that slice 0 is backed by gold tier 182(G), slice 1 is backed by silver tier 182(S), slice 2 is backed by bronze tier 182(B), and slice n is backed by gold tier 182(G).

Source drive 307 itself is made up of n+1 logical slices 308 (depicted as source drive logical slice #0 308-0, source drive logical slice #1 308-1, source drive logical slice #2 308-2, . . . , source drive logical slice #n 308-n), each of which is backed by a backing slice 312 (depicted as slices 312(1)-312(12)) drawn from storage pool 310. Thus, in accordance with the information from the tiering table 306, source drive logical slice #0 308-0 is backed by slice 312(1) from gold storage tier 182(G), source drive logical slice #1 308-1 is backed by slice 312(5) from silver storage tier 182(S), source drive logical slice #2 308-2 is backed by slice 312(9) from bronze storage tier 182(B), and source drive logical slice #n 308-n is backed by slice 312(2) from gold storage tier 182(G).

In accordance with techniques described herein (see FIG. 5 and accompanying text, below), when source drive 307 is cloned onto a cloned drive 327 sharing the same storage pool 310, cloned drive 327 has backing slices 312 having matching storage tiers 182. Thus, as depicted, cloned drive logical slice #0 328-0 is backed by slice 312(3) from gold storage tier 182(G), cloned drive logical slice #1 328-1 is backed by slice 312(7) from silver storage tier 182(S), cloned drive logical slice #2 328-2 is backed by slice 312(11) from bronze storage tier 182(B), and cloned drive logical slice #n 328-n is backed by slice 312(4) from gold storage tier 182(G).

Figure 4:
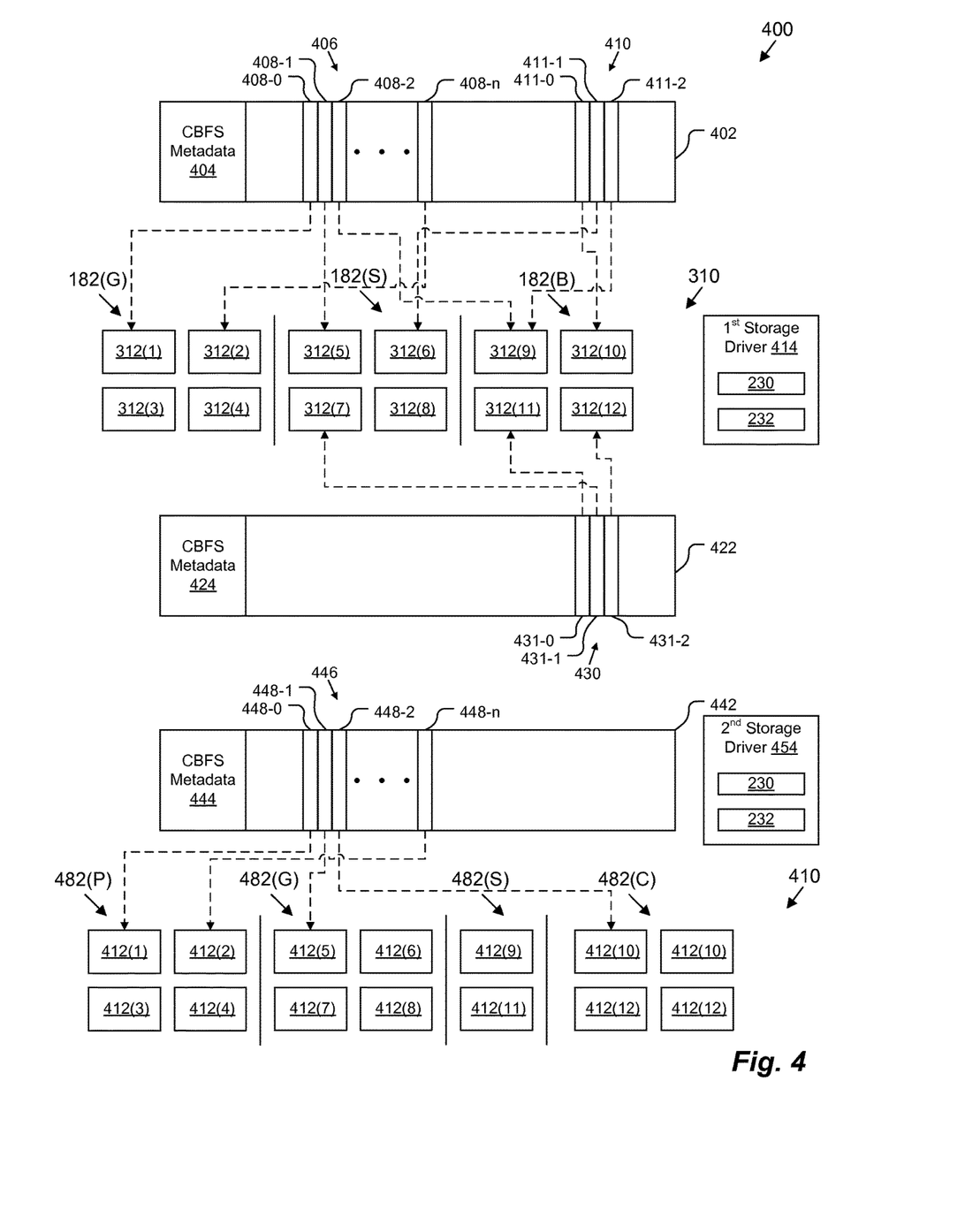
FIG. 4 is a block diagram depicting another example layout of slices in example cloning operations according to various embodiments.

FIG. 4 depicts another example arrangement 400 of particular example source logical disks 150 (depicted as source drive 406 and source snapshot 410) being cloned onto a particular example cloned logical disks 151 (depicted as cloned drives 446 and 430, respectively). As depicted, according to various embodiments, source drive 406 is realized as a file within a lower-deck filesystem, also known as a container block filesystem (CBFS) 402. CBFS 402 is a container filesystem which stores one or more volume files, which are files that are expressed as logical disks 150, 151.

As depicted, source drive 406 is made up of n+1 logical slices 408 (depicted as source drive logical slice #0 308-0, source drive logical slice #1 408-1, source drive logical slice #2 408-2, . . . , source drive logical slice #n 408-n), each of which is backed by a backing slice 312 (depicted as slices 312(1)-312(12)) drawn from storage pool 310, which is managed by a first storage driver 414. Tiering table 306 is not shown in FIG. 4 for simplicity, but it and other source drive metadata 302 may be stored within CBFS metadata 404 of CBFS 402. As depicted, source drive logical slice #0 408-0 is backed by slice 312(1) from gold storage tier 182(G), source drive logical slice #1 408-1 is backed by slice 312(5) from silver storage tier 182(S), source drive logical slice #2 408-2 is backed by slice 312(9) from bronze storage tier 182(B), and source drive logical slice #n 408-n is backed by slice 312(2) from gold storage tier 182(G).

As depicted, source snapshot 410 is also stored within CBFS 402. Source snapshot 410 represents a state of the source drive 406 as it existed at a prior point in time. As depicted, source snapshot 410 is made up of three logical slices 411 (depicted as source snap logical slice #0 411-0, source snap logical slice #1 411-1, and source snap logical slice #2 411-2), each of which is backed by a backing slice 312. Source snap logical slice #0 411-0 corresponds to source drive logical slice #0 408-0, but since it represents that slice at a different point in time, since which time changes have been made, it is backed by a different backing slice, 312(10) from bronze storage tier 182(B). Similarly, source snap logical slice #1 411-1 corresponds to source drive logical slice #1 408-1, but since it represents that slice at a different point in time, since which time changes have been made, it is backed by a different backing slice, 312(6) from silver storage tier 182(S). However, source snap logical slice #2 411-2 corresponds to source drive logical slice #0 408-2, but since, as depicted, no changes have been made, it is backed by the same backing slice, 312(9) from bronze storage tier 182(B) that also backs source drive logical slice #0 408-2. As depicted, source drive 406 has expanded to include n slices rather than only three slices since the snapshot 410 was made, so source snapshot 410 only includes three source snap logical slices 411 rather than n.

First storage driver 414 is responsible for managing storage pool 310 and all drives on all CBFSes that draw from that storage pool 310, including source drive 406 and source snapshot 410. First storage driver 414 may include its own instances of all or some of the components of front end 142, including its own instance of lower-deck filesystem manager 230 and storage pool manager 230.

Cloned drive 430, as depicted, is a freestanding clone of source snapshot 410 drawing from the same storage pool 310 but on a different CBFS 422 (having its own CBFS metadata 424). Thus, when source snapshot 410 is cloned onto a cloned drive 430 sharing the same storage pool 310, cloned drive 430 has backing slices 312 having storage tiers 182 that match those of source snapshot 410. Thus, as depicted, cloned drive logical slice #0 431-0 is backed by slice 312(11) from bronze storage tier 182(B), cloned drive logical slice #1 431-1 is backed by slice 312(7) from silver storage tier 182(S), and cloned drive logical slice #2 431-2 is backed by slice 312(12) from bronze storage tier 182(B).

In accordance with techniques described herein (see FIG. 5 and accompanying text, below), when source drive 406 is cloned onto a cloned drive 446 that does not share the same storage pool 310, rather drawing from storage pool 410, cloned drive 446 still has backing slices 412 having matching storage tiers 182. However, since storage pool 410 has four storage tiers 482 (depicted as platinum storage tier 482(P), gold storage tier 482(G), silver storage tier 482(S), and copper storage tier 482(C)), that do not all correspond exactly with the storage tiers 182 of storage pool 310, a closest available match must be used. As depicted, storage pool 410 includes its own slices 412 (depicted as slices 412(1)-412(12)) drawn from storage pool 410, which is managed by a second storage driver 454.

As an example, platinum storage tier 482(P) is drawn from high-speed flash or solid-state storage drives, gold storage tier 482(G) is drawn from high speed (e.g., 15,000 RPM) magnetic disk drives having medium-sized (e.g., 512 MB) caches, silver storage tier 482(S) is drawn from medium-high speed (e.g., 10,000 RPM) magnetic disk drives having small (e.g., 128 MB) caches, and copper storage tier 482(C) is drawn from slow (e.g., 5,400 RPM) magnetic disk drives without caches. In this example, platinum storage tier 482(P) corresponds exactly with gold storage tier 182(G), but the other storage tiers 482 do not correspond exactly to storage tiers 182 from storage pool 310. Thus, gold storage tier 482(G) is most closely-matched with silver storage tier 182(S) and copper storage tier 482(C) is most closely-matched with bronze storage tier 182(B), while silver storage tier 482(S) is not particularly closely-matched with any of the storage tiers 182 from storage pool 310, being intermediate between bronze storage tier 182(B) and silver storage tier 182(S).

Thus, as depicted, cloned drive logical slice #0 448-0 is backed by slice 412(1) from exact-match platinum storage tier 482(P), cloned drive logical slice #1 448-1 is backed by slice 412(5) from closest-match gold storage tier 482(G), cloned drive logical slice #2 448-2 is backed by slice 412(10) from closest-match copper storage tier 482(C), and cloned drive logical slice #n 448-n is backed by slice 412(2) from exact-match platinum storage tier 482(P). Silver storage tier 482(S) is not used for clones from source drives that draw from storage pool 310 unless the closest-match storage tiers 482 within storage pool 410 are not available (e.g., all slices 412 within gold storage tier 482(G) or copper storage tier 482(C) are already in use), in which case, silver storage tier 482(S) then may become the most-closely available match for bronze storage tier 182(B) or silver storage tier 182(S).

Second storage driver 454 is responsible for managing storage pool 410 and all drives on all CBFSes that draw from that storage pool 410, including cloned drive 446. Second storage driver 454 may include its own instances of all or some of the components of front end 142, including its own instance of lower-deck filesystem manager 230 and storage pool manager 230.

Figure 5:
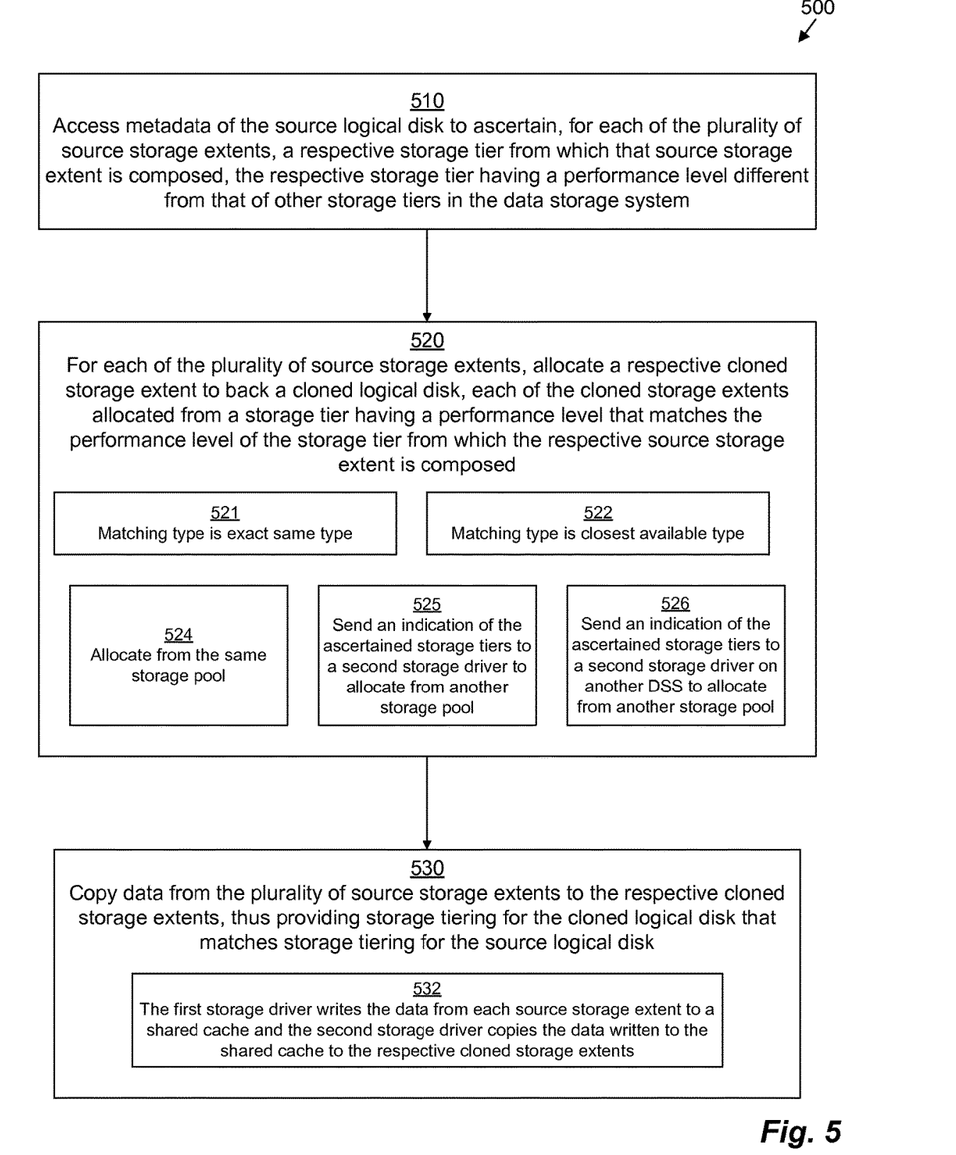
FIG. 5 is a flowchart depicting an example method according to various embodiments.

FIG. 5 illustrates an example method 500 performed by first storage driver 414 for matching the storage tiers 182 used to back a cloned logical disk 151 to the storage tiers 182 used to back a source storage volume 150. It should be understood that any time a piece of software (e.g., first storage driver 414, second storage driver 454, I/O stack 140 or any of its components) is described as performing a method, process, step, or function, in actuality what is meant is that a computing device (e.g., SP 120) on which that piece of software is running performs the method, process, step, or function when executing that piece of software on its processing circuitry 124. It should be understood that, in some embodiments, one or more of the steps may be omitted. Similarly, in some embodiments, one or more steps may be combined together or performed in a different order.

In step 510, first storage driver 414 accesses metadata 302 (e.g., tiering table 306) of the source logical disk 150 to ascertain, for each of the plurality of source storage extents (e.g., source drive logical slices 308, 408, or source snap logical slices 411), a respective storage tier 182 from which that source storage extent is composed, the respective storage tier 182 having a performance level different from that of other storage tiers 182 in the data storage system 116. Thus, in the case of cloning source drive 307, first storage driver 414 ascertains that source drive logical slice #0 308-0 is backed by slice 312(1) from gold storage tier 182(G), source drive logical slice #1 308-1 is backed by slice 312(5) from silver storage tier 182(S), source drive logical slice #2 308-2 is backed by slice 312(9) from bronze storage tier 182(B), and source drive logical slice #n 308-n is backed by slice 312(2) from gold storage tier 182(G).

Similarly, in the case of cloning source drive 406, first storage driver 414 ascertains that source drive logical slice #0 408-0 is backed by slice 312(1) from gold storage tier 182(G), source drive logical slice #1 408-1 is backed by slice 312(5) from silver storage tier 182(S), source drive logical slice #2 408-2 is backed by slice 312(9) from bronze storage tier 182(B), and source drive logical slice #n 408-n is backed by slice 312(2) from gold storage tier 182(G).

Similarly, in the case of cloning source snapshot 410, first storage driver 414 ascertains that source snap logical slice #0 411-0 is backed by slice 312(10) from bronze storage tier 182(B), source snap logical slice #1 411-1 is backed by slice 312(6) from silver storage tier 182(S), and source snap logical slice #2 411-2 is backed by slice 312(9) from bronze storage tier 182(B).

In step 520, first storage driver 414, for each of the plurality of source storage extents (e.g., source drive logical slices 308, 408, or source snap logical slices 411), allocates (or, causes to be allocated) a respective cloned storage extent 312, 412 to back respective cloned slices (e.g., cloned drive logical slices 328, 448, or 431) of a cloned logical disk (e.g., cloned drive 327, 446, 430), each of the cloned storage extents 312, 412 allocated from a storage tier 182, 482 having a performance level that matches the performance level of the storage tier 182, 482 from which the respective source storage extent is composed.

In some embodiments (sub-step 521), the storage tier 182, 482 having a performance level that matches the performance level of the storage tier 182, 482 from which the respective source storage extent is composed must be an exact match. In other embodiments (sub-step 522), if no exact match is available, a closest-available match is used.

In some embodiments (sub-step 524), first storage driver 414 performs step 520 by directly allocating the respective matching cloned storage extents from the same storage pool 310 as the source storage extents. This may be done when the cloned drive 327, 430 is on a CBFS 422 that is drawn from the same storage pool.

In other embodiments (sub-step 525), first storage driver 414 performs step 520 by sending an indication of the ascertained storage tiers 182 to the second storage driver 454 running on the same data storage system 116 so that the second storage driver 454 can allocate matching slices 412 from another storage pool 410 for the cloned drive 446. This may be done when the cloned drive 446 is on a CBFS 442 that is drawn from a different storage pool 410 on the same data storage system 116.

In other embodiments (sub-step 526), first storage driver 414 performs step 520 by sending an indication of the ascertained storage tiers 182 to the second storage driver 454 running on a destination data storage system different than the source data storage system 116 so that the second storage driver 454 can allocate matching slices 412 from another storage pool 410 on the other data storage system for the cloned drive 446. This may be done when the source drive 406 or source snap 410 is to be cloned onto a different data storage system.

Finally, in step 530, first storage driver 414 copies data from the plurality of source storage extents to the respective cloned storage extents, thus providing storage tiering for the cloned logical disk (e.g., cloned drive 327, 446, 430) that matches storage tiering for the source logical disk (e.g., source drive 307, 406, or source snapshot 410). Thus, for example, in the case of cloning source drive 406 onto cloned drive 446, the data from source slice 312(1) is copied to cloned slice 412(1), the data from source slice 312(5) is copied to cloned slice 412(5), the data from source slice 312(9) is copied to cloned slice 412(10), and the data from source slice 312(2) is copied to cloned slice 412(2).

In some embodiments (sub-step 532), first storage driver 414 performs step 530 by writing the data from each source storage extent to a shared cache (e.g., system cache 234) so that the second storage driver 454 can copy the data written to the shared cache 234 to the respective cloned storage extents 412. This may be done, when, for example, the cloned drive 446 is on a CBFS 442 that is drawn from a different storage pool 410 on the same data storage system 116.

Thus, techniques for matching the storage tiers 182, 482 used to back a cloned storage object (e.g., a cloned logical disk 151) with the storage tiers 182 used to back the source storage object (e.g., a source logical disk 150) from which the cloned storage object 151 is to be created. This may be done by determining the storage tier 182 for each storage extent 308, 408, 411 that backs the source storage object 150 and allocating, for each source storage extent, a corresponding cloned storage extent 312, 412 having a matching storage tier 182, 482 for the cloned storage object 151. Data may then be copied from each storage extent 312 on the source to the corresponding storage extent 312, 412 on the clone.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

What is claimed is:

1. A method of cloning a source logical disk backed by a plurality of source storage extents drawn from persistent storage of a data storage apparatus disposed within a single chassis, wherein the plurality of source storage extents that back the source logical disk are drawn from a first storage pool having multiple storage tiers with respective performance levels, the method comprising:
    accessing metadata of the source logical disk to ascertain, for each of the plurality of source storage extents, a storage tier of the multiple storage tiers of the first storage pool from which that source storage extent is composed;
    for each of the plurality of source storage extents, allocating a respective cloned storage extent from a second storage pool of the persistent storage of the data storage apparatus to back a cloned logical disk, each of the cloned storage extents being allocated from a storage tier having a performance level that matches the performance level of the storage tier from which the respective source storage extent is composed, wherein the second storage pool has multiple storage tiers with respective performance levels differing from the multiple storage tiers of the first storage pool; and
    in response to allocating, copying data from the plurality of source storage extents to the respective cloned storage extents, thus providing storage tiering for the cloned logical disk that matches storage tiering for the source logical disk.

2. The method of claim 1,
    wherein the source logical disk is realized by a first container file of a first container filesystem, the first container filesystem being backed by storage extents drawn from the first storage pool including the plurality of source storage extents that back the source logical disk;
    wherein the cloned logical disk is realized by a second container file within a second container filesystem backed by storage extents drawn from the second storage pool including the cloned storage extents that back the cloned logical disk, the first storage pool being managed by a first storage driver and the second storage pool being managed by a second storage driver distinct from the first storage driver;
    wherein accessing metadata of the source logical disk to ascertain, for each of the plurality of source storage extents, the storage tier from which that source storage extent is composed is performed by the first storage driver; and
    wherein allocating the respective cloned storage extent for each of the plurality of source storage extents to back the cloned logical disk includes the first storage driver sending an indication of each of the respective ascertained storage tiers to the second storage driver.

3. The method of claim 2 wherein copying data from the plurality of source storage extents to the respective cloned storage extents includes the first storage driver writing the data from each source storage extent to a shared cache and the second storage driver copying the data that was written to the shared cache from the shared cache to the respective cloned storage extents.

4. The method of claim 2,
wherein the metadata of the source logical disk is stored on and accessed from a metadata portion of the first container filesystem, the metadata portion of the first container filesystem being stored on the persistent storage of the data storage apparatus; and
wherein accessing metadata of the source logical disk includes accessing a tiering table stored within the metadata portion of the first container filesystem stored on the persistent storage of the data storage apparatus, the tiering table including a set of mappings, each mapping of the set corresponding to a respective source storage extent of the plurality of source storage extents and pointing to the storage tier from which that source storage extent is composed.

5. The method of claim 1 wherein allocating the respective cloned storage extent for each of the plurality of source storage extents to back the cloned logical disk includes allocating each cloned storage extent of a closest available type as the ascertained storage tier of the respective source storage extent.

6. The method of claim 1 wherein the multiple storage tiers includes a first storage tier made up of solid state storage drives and a second storage tier made up of magnetic disk drives.

7. The method of claim 1 wherein the plurality of source storage extents and the respective cloned storage extents all share a fixed extent size within a range of between 256 megabytes and 1 gigabyte.

8. The method of claim 1 wherein the method further comprises, after copying the data from the plurality of source storage extents to the respective cloned storage extents, refraining from keeping the plurality of source storage extents synchronized with the respective cloned storage extents.

9. A computer program product comprising a non-transitory computer-readable storage medium storing a set of instructions, which, when performed by computing circuitry of a data storage apparatus disposed within a single chassis, cause the data storage apparatus to clone a source logical disk backed by a plurality of source storage extents drawn from persistent storage local to the data storage apparatus, the plurality of source storage extents that back the source logical disk being drawn from a first storage pool having multiple storage tiers with respective performance levels, by:
accessing metadata of the source logical disk to ascertain, for each of the plurality of source storage extents, a storage tier of the multiple storage tiers of the first storage pool from which that source storage extent is composed;
for each of the plurality of source storage extents, allocating a respective cloned storage extent from a second storage pool of the persistent storage of the data storage apparatus to back a cloned logical disk, each of the cloned storage extents being allocated from a storage tier having a performance level that matches the performance level of the storage tier from which the respective source storage extent is composed, wherein the second storage pool has multiple storage tiers with respective performance levels differing from the multiple storage tiers of the first storage pool; and
in response to allocating, copying data from the plurality of source storage extents to the respective cloned storage extents, thus providing storage tiering for the cloned logical disk that matches storage tiering for the source logical disk.

10. The computer program product of claim 9 wherein allocating the respective cloned storage extent for each of the plurality of source storage extents to back the cloned logical disk includes allocating each cloned storage extent of a closest available type as the ascertained storage tier of the respective source storage extent.

11. The computer program product of claim 9 wherein the multiple storage tiers includes a first storage tier made up of solid state storage drives and a second storage tier made up of magnetic disk drives.

12. An apparatus comprising:
a chassis;
persistent storage disposed within the chassis; and
processing circuitry coupled to memory disposed within the chassis configured to clone a source logical disk backed by a plurality of source storage extents drawn from the persistent storage, the plurality of source storage extents that back the source logical disk being drawn from a first storage pool having multiple storage tiers with respective performance levels, by:
accessing metadata of the source logical disk to ascertain, for each of the plurality of source storage extents, a storage tier of the multiple storage tiers of the first storage pool from which that source storage extent is composed;
for each of the plurality of source storage extents, allocating a respective cloned storage extent from a second storage pool of the persistent storage to back a cloned logical disk, each of the cloned storage extents being allocated from a storage tier having a performance level that matches the performance level of the storage tier from which the respective source storage extent is composed, wherein the second storage pool has multiple storage tiers with respective performance levels differing from the multiple storage tiers of the first storage pool; and
in response to allocating, copying data from the plurality of source storage extents to the respective cloned storage extents, thus providing storage tiering for the cloned logical disk that matches storage tiering for the source logical disk.

13. The apparatus of claim 12 wherein allocating the respective cloned storage extent for each of the plurality of source storage extents to back the cloned logical disk includes allocating the each cloned storage extent of a closest available type as the ascertained storage tier of the respective source storage extent.

14. The apparatus of claim 12 wherein the multiple storage tiers includes a first storage tier made up of solid state storage drives of the persistent storage and a second storage tier made up of magnetic disk drives of the persistent storage.

* * * * *